(12) United States Patent
Matsuura

(10) Patent No.: US 6,478,103 B1
(45) Date of Patent: Nov. 12, 2002

(54) BRAKE SYSTEM LAYOUT FOR ATV

(75) Inventor: Tatsuya Matsuura, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/552,982

(22) Filed: Apr. 21, 2000

(30) Foreign Application Priority Data

Jul. 27, 1999 (JP) .......................................... 11-120361

(51) Int. Cl.⁷ .............................. B60T 7/04; B62J 25/00; B62K 23/08
(52) U.S. Cl. ........................ 180/90.6; 74/481; 74/512; 188/106 R; 188/152
(58) Field of Search ...................... 180/90.6; 296/75; 74/481, 502.2, 512; 188/106 R, 106 P, 2 D, 152, 344

(56) References Cited

U.S. PATENT DOCUMENTS

| | | | |
|---|---|---|---|
| 3,817,342 A | * 6/1974 | Hamilton | 180/227 |
| 3,838,756 A | * 10/1974 | Pottorff | 188/106 R |
| 3,960,030 A | * 6/1976 | Williams | 74/481 |
| 4,667,760 A | 5/1987 | Takimoto | |
| 5,211,256 A | 5/1993 | Muramatsu | |

FOREIGN PATENT DOCUMENTS

| | | | | |
|---|---|---|---|---|
| JP | 7-149273 | * 6/1995 | ............ | B62K/23/08 |
| JP | 7-293610 | * 11/1995 | ............ | B60T/7/02 |
| JP | 11-11371 | * 1/1999 | ............ | B62J/25/00 |
| JP | 11-79041 | * 3/1999 | ............ | B62K/23/00 |

OTHER PUBLICATIONS

Yamaha Kodiak 4WD Automatic, Parts Catalogue, Model Year 2000.
Yamaha Kodiak 2WD, Parts Catalogue, Model Year 2000.
"2001 Yamaha 400 4X4 Kodiak," Dirtwheels Magazine, Nov. 2000; pp. 108, 109, 111, 114.

* cited by examiner

Primary Examiner—Peter C. English
(74) Attorney, Agent, or Firm—Knobbe, Martens, Olson & Bear, LLP

(57) ABSTRACT

An all terrain vehicle comprises a compact layout for a brake system. The all terrain vehicle includes a front fender assembly, which is positioned above at least one front wheel, and a rear fender assembly, which is positioned above at least one rear wheel. An engine is supported by a frame assembly and is positioned between the front wheel and the rear wheel. A longitudinal plane extends along an outer lateral surface of the engine and a transverse plane extends along either a rearmost portion of the front fender assembly, a forwardmost portion of a foot step or an intersection between the front fender assembly and the foot step. A master cylinder of the braking system is disposed forward of the transverse plane and inward of the longitudinal plane. The master cylinder is independently operated by a hand actuator and a foot actuator. Movement of either of the actuators does not move the other of the actuators.

21 Claims, 6 Drawing Sheets

BRAKE SYSTEM LAYOUT FOR ATV

PRIORITY INFORMATION

This application is based on and claims priority to Japanese Patent Application No. 11-120,361, filed Apr. 27, 1999.

BACKGROUND OF THE INVENTION

1. Field of the Invention

The present invention generally relates to braking systems for all terrain vehicles. More specifically, the present invention relates to improved braking system layouts for such vehicles.

2. Related Art

All terrain vehicles are designed for used in rough and rugged terrain. The vehicles commonly employ high powered engines and are used to traverse the rough terrain at varying speeds. Operators typically straddle the vehicle with their feet positioned to either side of the engine and fuel tank combination. When in this position, the feet of the operators are disposed upon a platform that extends to the sides of the engine between the front wheel or wheels and the rear wheel or wheels.

When operating the vehicle, operators often desire larger foot board surface areas on which they can position their feet. The enlarged surface area reduces the likelihood of slipping from a squatting or otherwise raised position. Of course, the operators prefer slightly elevating themselves from the seats both for increased visibility and for comfort reasons. When levers and pedals are positioned on the foot boards or proximate the foot boards, the available support surface area is necessarily decreased.

Additionally, locating brake pedals or other levers in various locations about the foot boards can be undesirable. As will be appreciated, the vehicles are desirably simple in construction. Accordingly, it is desirable to maintain any connection or linkages as simple and straight forward as possible. Thus, while it is undesirable to locate a brake pedal in certain portions of the foot board, it often becomes necessary due to design constraints.

SUMMARY OF THE INVENTION

Accordingly, an all terrain vehicle having a simple and compact brake system is desired. The brake system desirably does not encroach upon the operator's available support area to a large degree and the brake system desirably is simply designed. The brake system preferably features both a hand actuator and a foot actuator that are implemented such that they operate independently of one another.

One aspect of the present invention involves an all terrain vehicle comprising a frame assembly. At least one front wheel and at least one rear wheel carry the frame assembly. A front fender assembly is positioned generally over the front wheel and a rear fender assembly is positioned generally over the rear wheel. At least one foot step is positioned between the front fender assembly and the rear fender assembly. An engine compartment is defined within the frame assembly and an engine is disposed within the engine compartment. The engine has at least one outer lateral surface and a generally vertical longitudinal plane extends along the outer lateral surface. A brake is connected to at least one of the front wheel or the rear wheel. A master cylinder communicates with the brake and the master cylinder is operated by a foot pedal. The foot pedal is disposed toward a center of the vehicle from the longitudinal plane.

Another aspect of the present invention involves an all terrain vehicle comprising a frame assembly. A front wheel is moveably connected to the frame assembly and a rear wheel is moveably connected to the frame assembly. An engine is connected to the frame assembly generally between the front wheel and the rear wheel. A seat is disposed generally above at least a portion of the engine. A steering handle is connected to the front wheel and is positioned forward of the seat. A hand actuator is connected to the steering handle and a foot actuator is disposed to one side of the seat. A braking system is connected to the hand actuator and the foot actuator with the braking system comprising a master cylinder. One of the hand actuator and the foot actuator is capable of selective operation of the braking system independently of the other of the hand actuator and the foot actuator.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
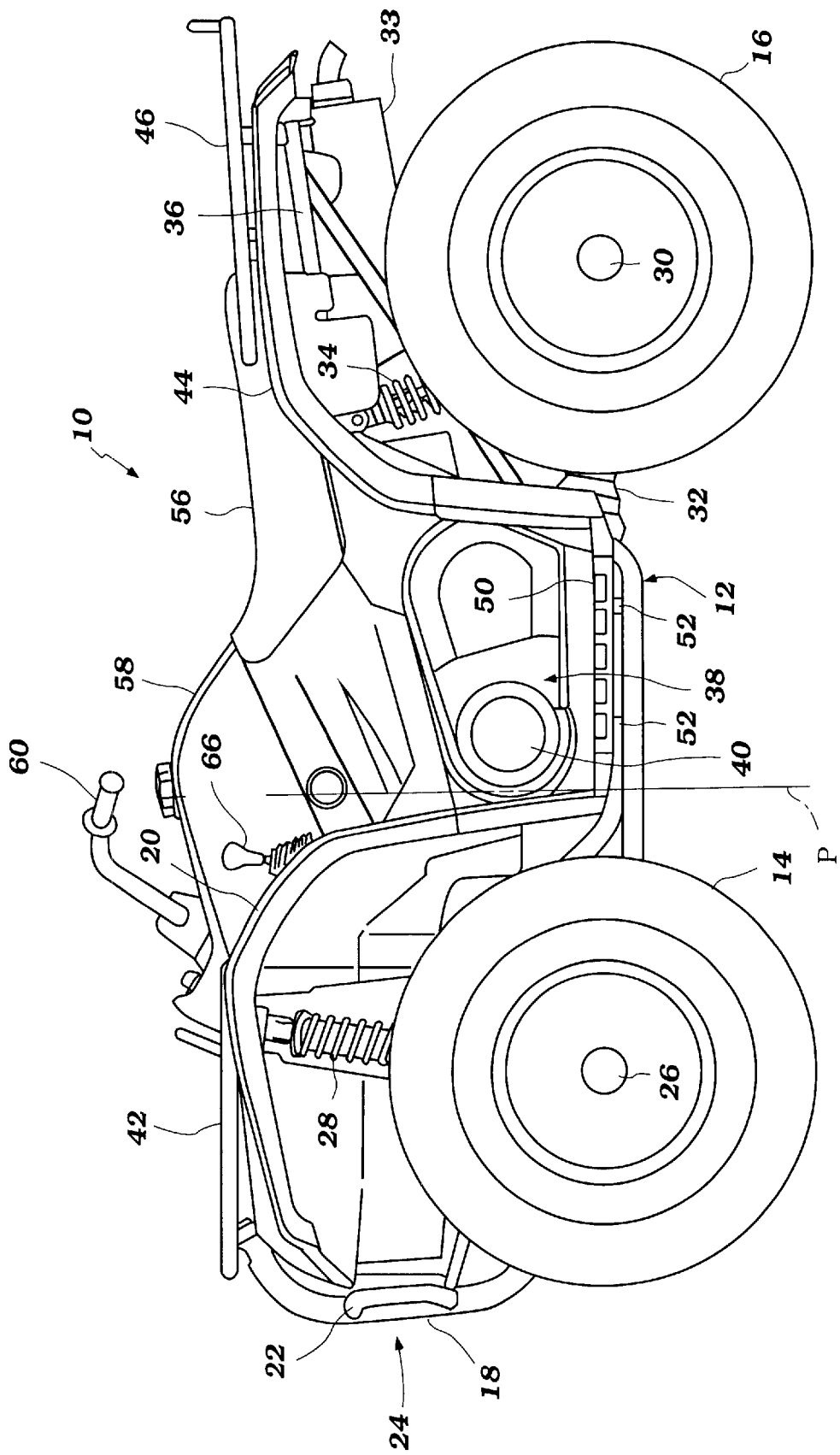
FIG. 1 is a side elevation view of an all terrain vehicle having a braking system layout configured and arranged in accordance with certain features, aspects and advantages of the present invention.

With reference now to FIG. 1, an offroad or all terrain vehicle, which is generally indicated by the reference numeral 10, is illustrated therein. The vehicle 10 preferably is arranged and configured in accordance with certain features, aspects and advantages of the present invention. More particularly, the vehicle 10 preferably comprises a brake system, which will be described below, that is arranged and configured in accordance with certain features, aspects and advantages of the present invention. While the present invention will be described in the context of the illustrated vehicle 10, it should be understood that the present invention may also find utility in a number of other applications. For instance, although the illustrated vehicle 10 comprises four wheels, the present invention could be used on motor vehicles having two wheels, three wheels or more than four wheels. In addition, the present invention can also be used on vehicles having runners and tracks or other drive arrangements. Those of ordinary skill in the relevant arts will readily appreciate additional areas within the broad array of applications in which the present invention can be used.

With continued reference to FIG. 1, the illustrated vehicle 10 generally comprises a frame assembly 12 that is dirigibly supported by a plurality of wheels. In the illustrated arrangement, the frame assembly 12 is carried by a pair of front wheels 14 and a pair of rear wheels 16. As will be recognized, the vehicle 10 could be carried by a single forward wheel and a pair of rear wheels, a pair of forward wheels and single rear wheel, or any number of front or rear wheels. Furthermore, as discussed above, the present invention can also be used with vehicles that utilize driving track arrangements and forward runners for instance.

The frame assembly 12 is generally of the welded up type, such as that known to those of ordinary skill in the art. While not illustrated, the presently preferred type of frame comprises a left side assembly and right side assembly. The left side assembly and the right side assembly form generally parallelogram side structures that are interconnected with crossing members. Because these assemblies are well known to those of ordinary skill in the art, further description of the frame assembly 12 is deemed unnecessary to understand the present invention.

Figure 2:
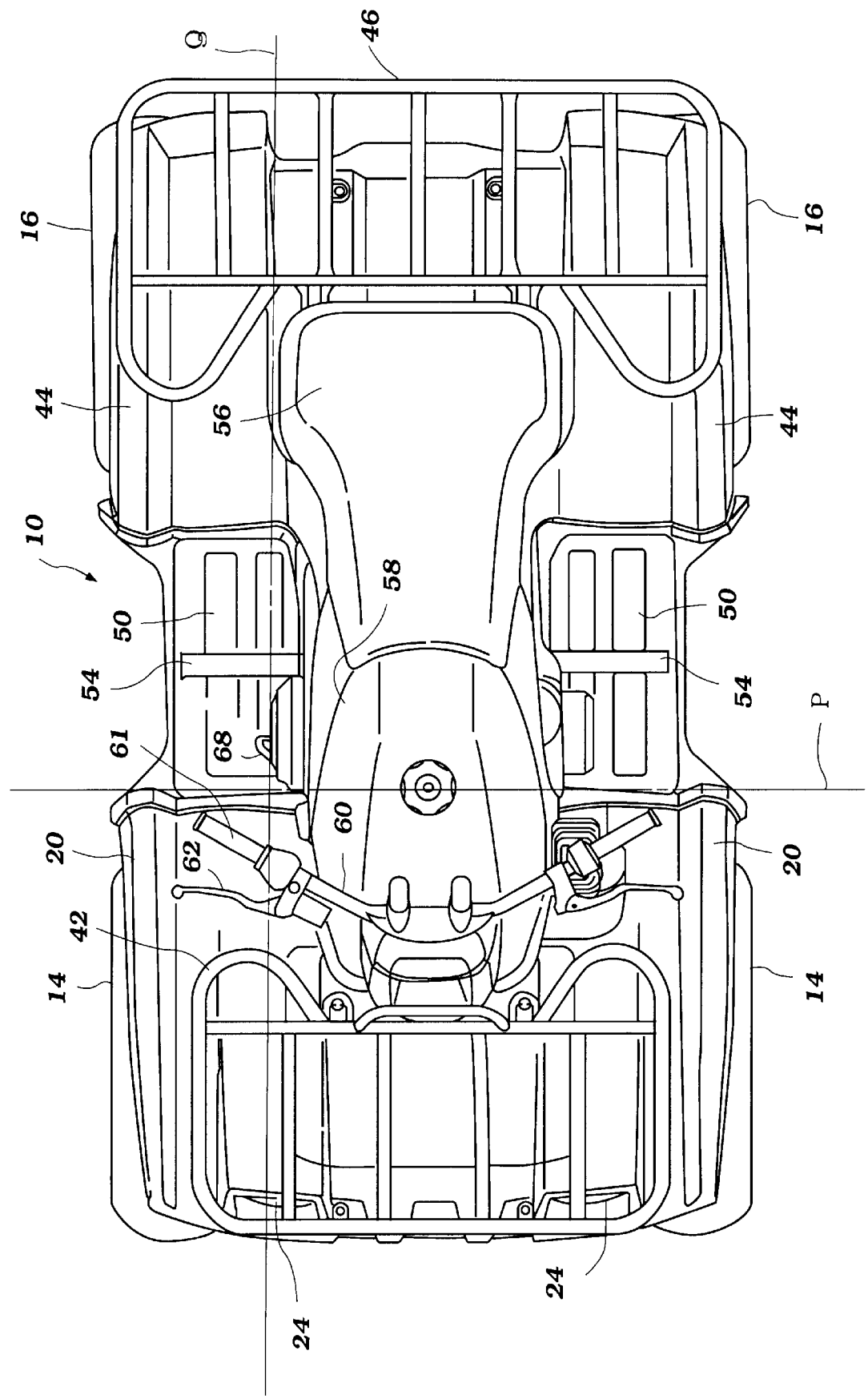
FIG. 2 is a top plan view of the vehicle of FIG. 1.

A forward portion of the illustrated frame assembly 12 comprises a front bumper 18. The front bumper 18 preferably extends upwardly and forwardly of a lower portion of the illustrated frame assembly 12. In this manner, the front bumper 18 wraps over a forward portion of a front fender assembly 20, which will be described below. Additionally, the front bumper 18 comprises a pair of headlight protectors 22 that extend laterally outward from the front bumper 18. The illustrated headlight protectors 22 wrap around and protect a pair of forwardly directed headlights 24, which are best shown in FIG. 2. The front bumper 18 can be formed integrally with the frame assembly 12 or can be a separate add-on component, as will be recognized by those of ordinary skill in the art.

The illustrated front wheels 14 are rotatably supported by a front suspension system. The illustrated front suspension system generally comprises a pair of A arms, which are not shown. The A arms preferably extend laterally outward from the frame assembly 12 and support a carrier hub, which also is not shown. Each front wheel 14 is supported by a front axle 26 that is journaled by the carrier hub (not shown). In addition, a shock absorber or strut 28 extends between a portion of the frame assembly 12 and the carrier hub to control vertical movement of the axle 26 during operation of the vehicle 10. Each shock absorber 28 is mounted in a suitable manner at an upper portion to the frame assembly 12 and at a lower portion to either the A arm or the carrier hub. Because these arrangements are well known to those of ordinary skill in the art, further description of these assemblies is deemed unnecessary.

With continued reference to FIG. 1, the rear wheel 16 preferably also rotates about an axle 30. In the illustrated arrangement, both of the rear wheels 16 are mounted to a common axle 30. The illustrated axle 30 is rotatably supported by a rear swing arm 32, which extends from a portion of the frame assembly 12. Movement of the rear arm 32, and therefore the axle 30, is controlled using a shock absorber 34. The swing arm 32 preferably is pivotally attached to the frame assembly 12 and rotates about a generally horizontal axis. The shock absorber 34 can be connected to the swing arm 32 or to a gear box that is attached to a portion of the swing arm 32 proximate the axle 30. In addition, an upper portion of the shock absorber 34 preferably is connected to a portion of the frame assembly 12 such as a seat rail 36. In this manner, movement of the rear wheels 16 about the pivot point defined by the swing arm 32 can be controlled. Of course, as will be recognized by those of ordinary skill in the art, the rear wheels 16 also can be independently mounted in any suitable manner. In the illustrated arrangement, a muffler 33 is connected to the frame directly rearward of the shock absorber 34.

The illustrated frame assembly 12 forms a platform upon which a variety of other components are mounted. For instance, the hollow center of the illustrated frame assembly 12 generally defines an engine compartment 38. The engine compartment 38 generally is defined between the left portion and the right portion of the frame assembly 12 and is disposed between the front axle 26 and the rear axle 30. This location provides a low center of gravity for the vehicle by mounting a centrally located engine 40 within the engine compartment 38. The engine 40 can be of any suitable construction and can be positioned either transversely or longitudinally within the engine compartment 38. In other words, a crankshaft (not shown) of the engine 40 can extend transverse to the direction of travel of the vehicle 10 or can extend along the same direction of travel of the vehicle.

As indicated above, a forward fender assembly 20 preferably is disposed above the forward wheels 14. The forward fender assembly 20 can be comprised of a single component or multiple components and preferably extends around the front portion of the vehicle 10. In the illustrated arrangement, a carrier rack 42 is mounted above a portion of the front fender assembly 20. The front fender assembly 20 desirably is made from a moldable resin material or a lightweight sheet metal and preferably is mounted to the frame assembly in any suitable manner. The illustrated arrangement uses threaded fasteners to removably attach the front fender assembly 20 to the frame assembly 12.

A rear fender assembly 44 is disposed above the rear wheels 16 on the illustrated vehicle 10. Similar to the front fender assembly 20, the rear fender assembly 44 desirably extends above both rear wheels 16 and preferably is formed as one or more than one components. In the illustrated arrangement, the rear fender assembly 44 is formed of a single component and carries a rear carrying rack 46. The rear fender assembly 44 can be manufactured from a variety of materials including molded resin composites and lightweight sheet metals. Desirably, the rear fender assembly 44 and the front fender assembly 20 protect the operator of the vehicle from debris kicked up by the tires during movement of the vehicle 10.

With reference now to FIG. 2, a pair of footsteps 50 extend laterally from a central portion of the illustrated vehicle 10. The footsteps 50 can be mounted to the frame assembly 12 in any suitable manner. Typically, the footsteps 50 are mounted using brackets 52, which extend outward from the frame assembly 12. Preferably, the footsteps 50 extend between a portion of the rear fender assembly 44 and a portion of the forward assembly 20 to create an enclosed and protected rider leg area. In addition, the footsteps 50 preferably include traction increasing surfaces, such as raised ridges 54 to increase foot traction for the operator of the vehicle 10. In some arrangements, the footsteps 50 (also called foot boards) comprise plate-like members. In other arrangements, the footsteps 50 are nerf bars. In yet other applications, the footsteps are tubular components upon which a rider can be supported.

A seat 56 preferably is disposed above a portion of the rear fender assembly 44. The seat 56 generally is configured to allow an operator to sit in straddle fashion with one leg on each footstep 50. Of course, the seat 56 can be configured to accommodate more than one rider in a tandem straddle fashion. The illustrated seat 56 is mounted to the seat rails 36 in any suitable manner, but preferably is mounted to the seat rails 36 in a locking and pivoting arrangement. More particularly, the seat 56 preferably includes a portion which is pivotably attached to the seat rails 36 such that the seat 56 can be unlatched and raised to access the engine compartment 38. In some arrangements, the seat can freely pivot and is not latched; however, latching better secures the seat 56 to the frame assembly.

With continued reference to FIGS. 1 and 2, a fuel tank 58 preferably is disposed forward of the illustrated seat 56. The fuel tank 58 is mounted in any suitable manner and can be made from any suitable material. Preferably, the fuel tank 58 is made from molded resin materials; however, the fuel tank 58 also can be formed from a lightweight metal material. The fuel tank 58 preferably is mounted rearward of a steering handle assembly 60.

The steering handle assembly 60 is coupled to the front wheels 14 through a suitable steering arrangement, which is not shown. The steering handle arrangement 60 also generally comprises a throttle actuator of some sort. In one arrangement, the throttle actuator is a twist grip 61. In other arrangements, the throttle actuator may be a thumb paddle or handpull lever. Moreover, as will be described below, a brake control lever 62 can be mounted to the handlebar assembly 60 for operation of the brakes in a manner which will become apparent.

The vehicle 10 preferably also includes a gear shifting arrangement. The gear shifting arrangement preferably is controlled by means of a gear shift lever 66. The gear shift lever 66 can be positioned anywhere proximate the operator of the vehicle 10 such that the gear shift lever 66 can be easily actuated by the operator. In some arrangements, the gear shift lever 66 operates a shifting mechanism for use when the vehicle is on the fly and in other arrangements the gear shift operator actuator 66 is used to control the gear shifting while the vehicle is at a standstill. In one arrangement, the gear shift actuator 66 is mounted within a recess formed within the forward fender assembly 20. An actuator relay assembly, which is not shown, generally transfers movement of the actuator 66 to a shift drum positioned within the transmission case in the illustrated arrangement.

The illustrated vehicle 10 also comprises a foot brake actuator 68. The foot brake actuator 68 will be described in greater detail below. Generally speaking, the foot brake actuator 68 is pivotably attached to the frame assembly 12 through a suitable mounting bracket. When the foot brake actuator 68 is depressed by the foot of an operator, the brakes are applied in a manner which acts to slow the vehicle to a stop. In some arrangements, the foot brake actuator 68 can operate a parking brake or can actuate all or fewer than all of the brakes associated with the wheels 14, 16. Preferably, the foot brake actuator 68 extends upwardly through a hole 70 defined within the footboard 50. In this arrangement, the majority of the foot brake actuator 68 is positioned out of the leg area of the vehicle 10.

Figure 3:
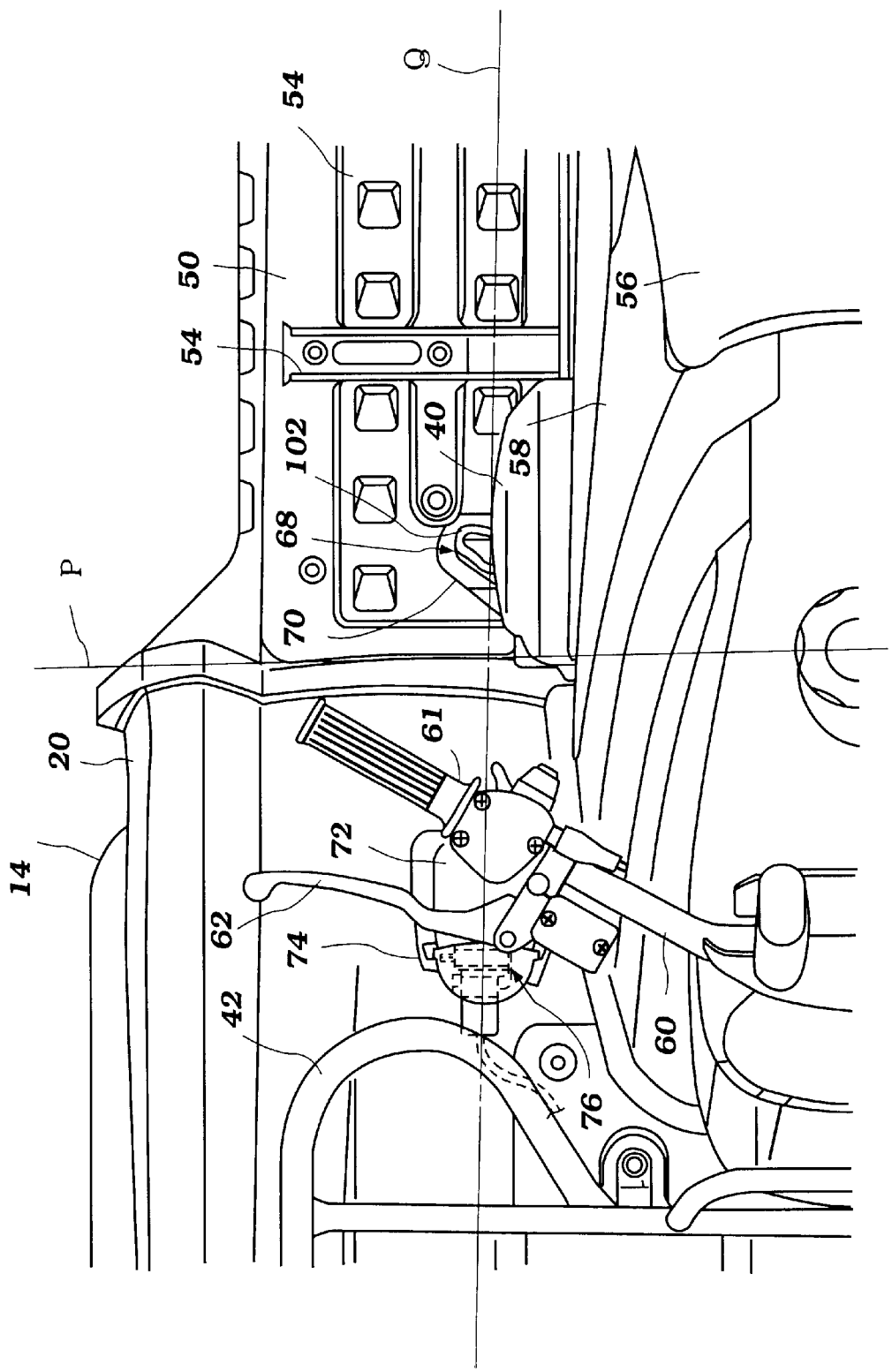
FIG. 3 is an enlarged partial top plan view of the vehicle of FIG. 1, illustrating a presently preferred positioning of a foot actuator and a hand actuator.
Figure 4:
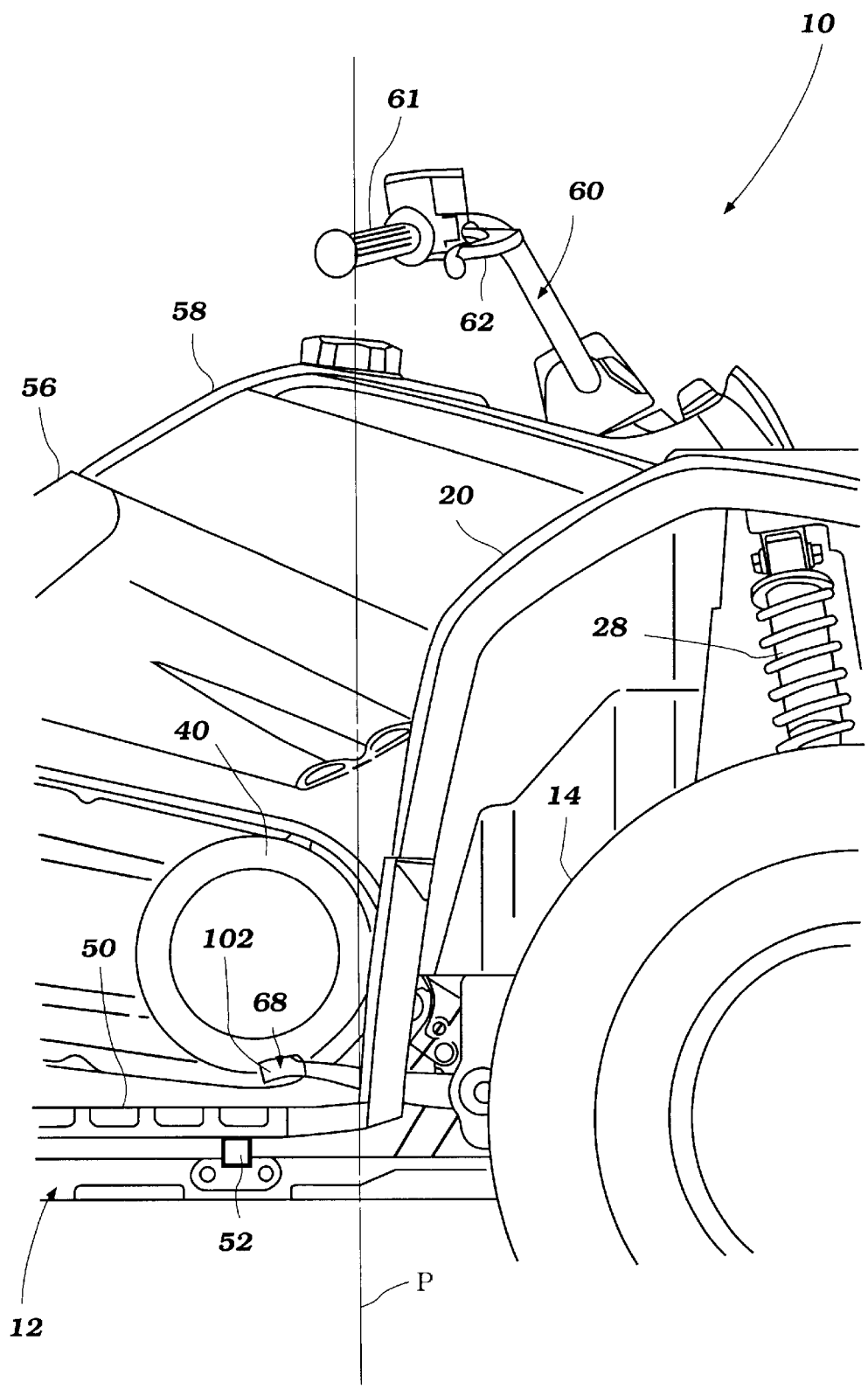
FIG. 4 is an enlarged partial side elevation view of the vehicle of FIG. 1, illustrating the presently preferred positioning of the foot actuator and the hand actuator.

With reference now to FIG. 3, an electrical outlet 76 is illustrated therein. The electrical outlet 76 preferably is disposed within a recess 72 formed within a portion of the front fender assembly 20. The electrical outlet 76 can be used to power electrical appliances through energy drawn from the battery and/or generator associated with the engine 40. The electrical outlet 76 preferably is positioned forward of a knee of the operator and proximate the mounting rack 42 upon which the electrical appliances being powered can be placed. In the illustrated arrangement, a hood 74 is disposed above a portion of the electrical outlet 76 to shield the electrical outlet 76 from splashing mud and water.

Figure 5:
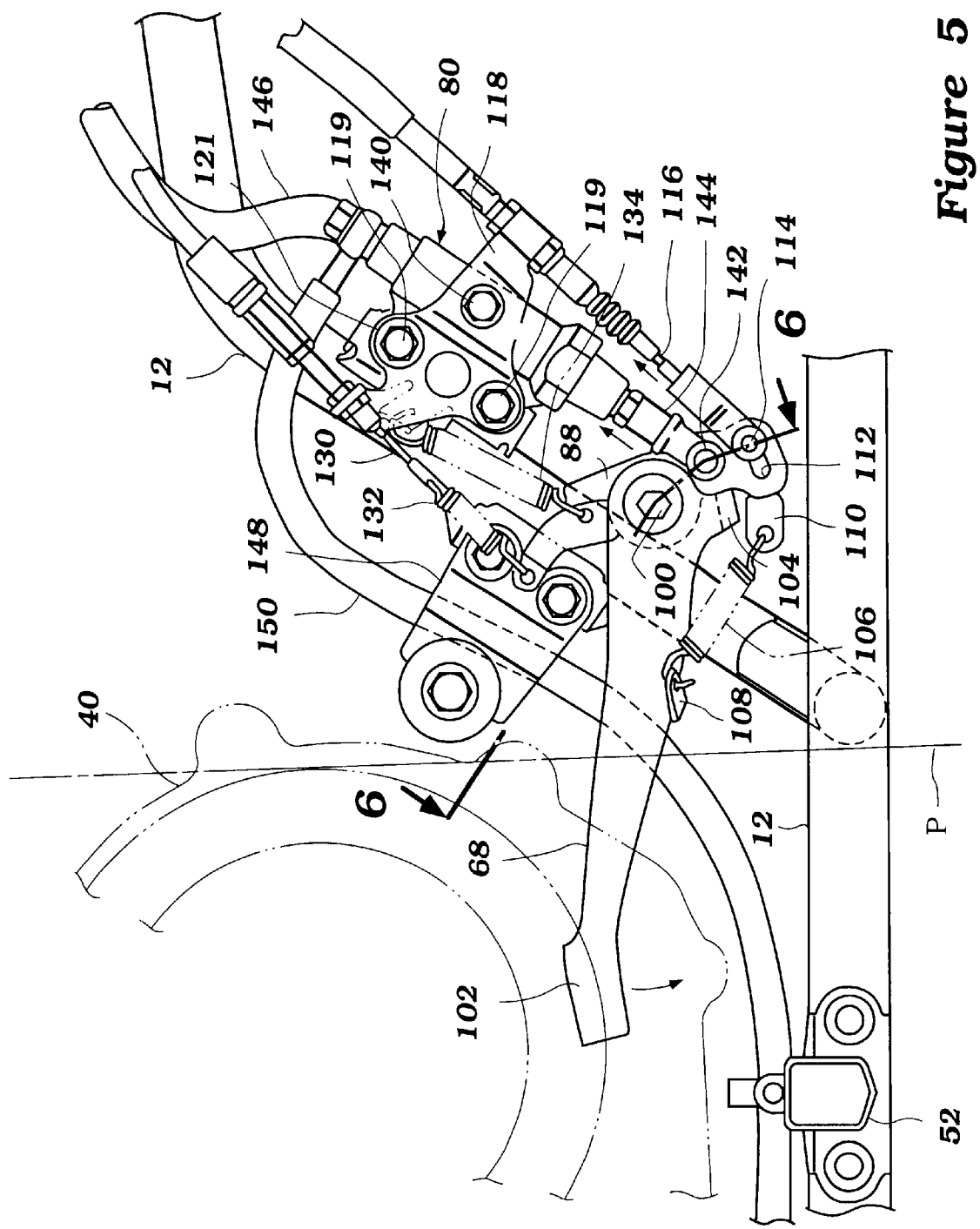
FIG. 5 is an enlarged partial side elevation view of various components of the brake system, illustrating the presently preferred interconnection and positioning of such components; and, FIG. 6 is a sectioned view of a presently preferred mounting arrangement for the foot actuator taken along the line 6—6 in FIG. 5.
Figure 6:
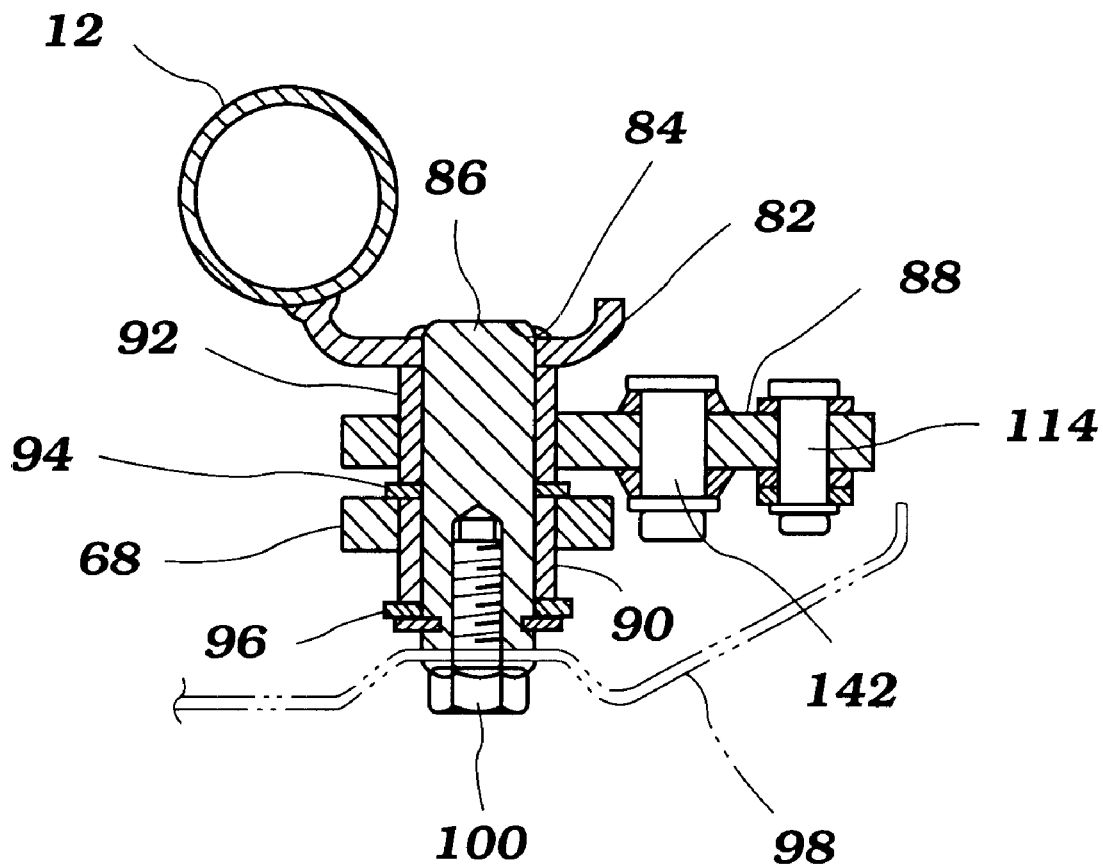

With reference now to FIGS. 5 and 6, the brake system layout of the illustrated vehicle 10 will be described in greater detail. The illustrated brake system generally features the foot actuator 68, the hand actuator 62 and a master cylinder 80. In general, movement of either the hand actuator 62 or the foot actuator 68 generates hydraulic pressure within the master cylinder 80. Fluid driven through the brake system by the master cylinder is used to operate a set of rear brakes (not shown) in the illustrated arrangement. The rear brakes can be disk brakes or drum brakes and preferably are positioned within the hubs of the rear wheels 16 in any suitable manner. In some arrangements, the brake system can be used to operate a transmission brake, which restrains movement of the transmission in any known manner.

With reference now to FIG. 6, a brake lever mounting bracket 82 preferably is secured to a portion of the frame assembly 12. More preferably, the bracket 82 is secured to a portion of the frame assembly forward of the engine 40 and, even more preferably, forward of a generally vertical plane P defined through the forward end of the foot boards 50. In the illustrated arrangement, the bracket 82 is welded to a lower portion of a down tube of the frame assembly 12.

The illustrated bracket 82 includes a receptor aperture 84. The receptor aperture 84 receives a pivot shaft 86, about which the foot actuator 68 pivots. In one arrangement, the pivot shaft 86 is secured in position with a set of snap rings. In another arrangement, the pivot shaft 86 is secured in position with other types of mechanical fasteners, such as a bolt and washer combination. Additionally, the pivot shaft 86 can be rotatably secured to the bracket 82 in any other suitable manner. In some applications, such as the illustrated arrangement, the pivot shaft 86 is fixed relative to the bracket 82. In such applications, the shaft 86 can be interference fit to the bracket 82, welded to the bracket 82 or otherwise suitably attached to the bracket 82. As will be appreciated, extending the shaft 86 through the bracket 82 and welding the shaft 86 to the bracket 82 on the back side of the bracket provides a smoother surface on the load carrying side of the bracket 82 as well as substantially increases the strength of the connection.

With continued reference to FIG. 6, the foot actuator 68 preferably is pivotally secured to the pivot shaft 86. In addition, a brake lever 88 is pivotally secured to the illustrated pivot shaft 86. In the illustrated arrangement, a corresponding pair of sleeves 90, 92 are used to connect the foot actuator 68 and the brake lever 88 to the shaft 86. While the two sleeves could be interchanged in some applications, the brake lever sleeve 92 preferably is interposed between the bracket 82 and the foot actuator sleeve 90. The sleeves 90, 92 are sized to freely slide relative to the shaft 86 in the illustrated arrangement. In addition, the sleeves 90, 92 preferably are separated by a snap ring or washer 94. Such an arrangement reduces wear between the two components 90, 92. Furthermore, the outer sleeve, which is the foot actuator sleeve 90 in the illustrated arrangement, desirably is secured in position along the shaft 86 by a set of snap rings 96. Of course, in the illustrated arrangement, one of the snap rings can be replaced by a washer or the like.

A protective cover 98, which can cover at least one of the components of the brake system, preferably is attached to the pivot shaft 86 using a threaded fastener 100. Of course, the cover 98 can be attached in any suitable manner; however, it is preferred that the cover 98 be easily removed for servicing the brake system as necessary.

With reference again to FIG. 5, the illustrated foot actuator 68 extends generally rearward from the pivot shaft$ 86 Preferably, the foot actuator 68 extends rearward at a location generally toward the center of the vehicle 10 from a generally vertical longitudinal plane Q that extends along an outer surface of the engine 40 (see FIGS. 2 and 3). More preferably, however, a foot step portion 102 of the foot actuator 86 extends outside of this plane Q. Such a configuration reduces the encroachment of the braking system into the leg area of the operator.

With continued reference to FIG. 5, a boss 104 extends inward from a lower portion of the foot actuator 68. The boss 104 also could extend outward from the brake lever 88 in some arrangement. The boss 104 registers the foot actuator 68 in contact with the brake lever 88 As will be appreciated, the use of the boss 104 to place the two components 68, 88 in registry allows the brake lever 88 to move independently of the foot actuator 68 while movement of the foot actuator 68 causes movement of the brake lever 88. For instance, if the operator steps on the foot actuator 68, the foot actuator 68 rotates in a counterclockwise direction about the shaft 86 and the foot actuator 68 contacts the boss 104, which drives the brake lever 88 in the same counterclockwise direction about the shaft 86.

A spring 106, which is connected to a flange 108 that extends from the foot actuator 68 and to a flange 110 that extends from the brake lever 88, biases the illustrated brake lever 88. More specifically, in the illustrated arrangement, the spring 106 pulls the lever 88 in a clockwise direction about the shaft 86. This biasing force acts to return the foot actuator 68 to a home position after the foot step portion 102 has been depressed.

With continued reference to FIG. 5, the brake lever 88 also includes a slotted opening 112. The slotted opening 112 cooperates with a pin 114 that connects a brake wire 116 to the brake lever 88. The illustrated brake wire 116 extends through a wire retention bracket 118 to the hand brake actuator 62. Preferably, the bracket 118 also is connected to a mounting boss 121, which is welded to the frame assembly 12. In the illustrated arrangement, the bracket 118 is secured to the mounting boss 121 using a plurality of threaded fasteners 119; however, other suitable means of attaching the bracket 118 can be used. The brake wire 116 preferably is of the Bowden-wire type and includes a protective outer casing and an inner wire that moves relative to the outer casing. The wire 116 is clamped to the bracket 118 in any suitable manner.

The pin 114 secures the end of the wire 116 to the brake lever 88. Because the pin is disposed within the slotted opening 112, the brake lever 88 is capable of movement without causing movement of the wire 116 in the illustrated arrangement. In other words, the pin 114 advantageously translates within the slotted opening 112 when the brake lever 88 rotates about the shaft 86. Thus, if the brake lever 88 is moved using the foot actuator 68, the hand actuator 62 is not affected. In addition, due to the use of the boss 104, if the hand actuator 62 is used to move the brake lever, the foot actuator 68 is not affected. Thus, the two actuators move independent of each other.

With continued reference to FIG. 5, a control wire 130 also is connected to the illustrated brake lever 88. In the illustrated arrangement, the control wire 130 is secured to an upper portion of the brake lever 88 using a spring 132. The control wire 130 passes through a portion of the wire retention bracket 118, which is described above. The control wire 130, which is preferably of the Bowden-wire type as well, can be secured to the bracket 118 in any known manner. The control wire 130 preferably is used to control a counter force that opposes movement of the brake lever 88 about the shaft 86. For instance, if the control wire 130 is tightened, movement of the brake lever 88 about the shaft 86 becomes more difficult. In addition, if the control wire 130 is loosened, movement of the brake lever 88 about the shaft 86 becomes easier.

Closer to the pivot axis defined by the shaft 86, the brake lever 88 is connected to the bracket 118 with a further spring 134. The spring 134 provides a slight return force even if the control wire 130 is broken or otherwise removed. In addition, due to the connection locations of the two springs 132, 134, and the respective radii from the connection points to the pivot axis, the forces set up by the two springs preferably are vastly different. Moreover, through the use of the control wire 130, the location about the pivot at which both springs begin operating (rather than only spring 134) can be varied.

With reference now to FIG. 5, the master cylinder 80 preferably is connected to the wire retention bracket 118. In the illustrated arrangement, at least one threaded fastener 140 connects the master cylinder 80 to the bracket 118. A pin 142 preferably directly connects the brake lever 88 to a piston 144 of the master cylinder 80. Thus, as the brake lever 88 pivots about the shaft 86, the piston 144 is driven relative to the master cylinder 80. Movement of the piston 144 relative to the master cylinder 80 generates the hydraulic force needed to operate at least the rear brakes in the illustrated arrangement. In some application, a pair of master cylinders can be used such that one master cylinder operates the front brakes and the other master cylinder operates the rear brakes. Of course, a single master cylinder can be used to operate both sets of brakes in some applications.

The illustrated master cylinder 80 is supplied with brake fluid through a reservoir conduit 146. The reservoir conduit 146 preferably extends from a brake fluid reservoir to the master cylinder 80. In the illustrated arrangement, the brake fluid reservoir is positioned at a location substantially higher than the master cylinder. Such a positioning reduces the likelihood of water infiltrating the brake system.

The illustrated master cylinder 80 also outputs hydraulic pressure through a hydraulic supply line 150. In the illustrated arrangement, the master cylinder 80 is disposed generally forward of a generally vertical transverse plane P extending along a forward surface of the engine 40, Furthermore, in the illustrated arrangement, the master cylinder 80 is disposed laterally inward of the longitudinal plane Q extending along an outer lateral surface of the engine, The supply line 150 extends from the illustrated master cylinder to the operable components of the brake system (i.e., actuator for brake shoes). In the illustrated arrangement, the supply line 150 extends downward at a location generally inward from an engine mounting bracket 148 and rearward from a location generally forward of the engine 40.

When applying the brakes using the foot actuator 68, an operator steps on the foot step portion 102 of the foot actuator 68. The foot step portion 102 extends upward through the hole 70 in the right foot board 50. Of course, the brake system can be mounted on either side of the vehicle; however, this discussion presumes that the brake system is mounted on the right side of the vehicle. The hole 70 preferably is disposed on an inner portion of the foot board 50 proximate the engine 40. When the foot step portion 102 is depressed, the foot actuator 68 pivots about the shaft 86.

As the foot actuator 68 pivots about the shaft 86, the boss 104 is urged against the brake lever 88 in a counterclockwise direction. The brake lever 88 rotates against the forces set up by the biasing members (i.e., springs 104, 132 and 134 in the illustrated arrangement). Movement of the brake lever compresses the piston 144 into the master cylinder 80. Compression of the fluid increases the pressure within the line 150 and the brakes are deployed. Releasing the foot actuator 68 results in the brake lever returning to its home position under the biasing forces of the biasing members. The return movement retracts the piston 144 from the master cylinder 80 and the pressure within the supply line 150 decreases.

Similarly, when the hand actuator 62 is squeezed, the wire 116 moves upward within the casing. The movement of the wire 116 pulls the brake lever 88 about the pivot shaft 86. The movement of the brake lever 88 about the pivot shaft 86 is opposed by the biasing members and the brakes are deployed as described directly above. When the hand actuator is released, the brake lever 88 returns to the home position and the pressure within the brake system decreases.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An all terrain vehicle comprising a frame assembly, at least one front wheel and at least one rear wheel carrying said frame assembly, a front fender assembly being positioned generally over said front wheel and a rear fender assembly being positioned generally over said rear wheel at least one foot step being positioned between said front fender assembly and said rear fender assembly, an engine compartment being defined within said frame assembly, an engine being disposed within said engine compartment, said engine having at least one outer lateral surface, a generally vertical longitudinal plane extending along said outer lateral surface, a master cylinder adapted to control a brake, said master cylinder being operated by a foot pedal, at least a portion of said foot pedal being disposed toward a center of said vehicle from said longitudinal plane, and a generally vertical transverse plane extending along a rearmost portion of said front fender assembly and said master cylinder being positioned generally forward of said transverse plane.

2. The vehicle of claim 1, wherein said foot step comprises an opening and said foot pedal comprises a portion which extends upward through said opening.

3. The vehicle of claim 2, wherein said master cylinder is disposed forward of said portion of said foot pedal which extends upward through said opening.

4. The vehicle of claim 1, wherein said foot pedal is pivotally mounted to said frame assembly at a location generally forward of said transverse plane.

5. The vehicle of claim 4, wherein said foot pedal selectively operates said master cylinder through an intermediate lever.

6. The vehicle of claim 5, wherein said intermediate lever is a brake lever that is pivotally mounted to said frame assembly at a location generally forward of said transverse plane.

7. The vehicle of claim 6, wherein said intermediate lever and said foot pedal are pivotally mounted to said frame assembly about the same pivot axis.

8. The vehicle of claim 4, wherein said foot pedal is pivotally mounted to said frame assembly with a pivot shaft and sleeve combination.

9. The vehicle of claim 1, wherein a forward end of said foot pedal is pivotally mounted to a shaft.

10. The vehicle of claim 1, further comprising a hand actuator that is operatively connected to said master cylinder by a brake wire.

11. An all terrain vehicle comprising a frame assembly, at least one front wheel and at least one rear wheel carrying said frame assembly, a front fender assembly being positioned generally over said front wheel and a rear fender assembly being positioned generally over said rear wheel, at least one foot step being positioned between said front fender assembly and said rear fender assembly, an engine compartment being defined within said frame assembly, an engine being disposed within said engine compartment, said engine having at least one outer lateral surface, a generally vertical longitudinal plane extending along said outer lateral surface, a master cylinder adapted to control a brake, said master cylinder being operated by a foot pedal, and at least a portion of said foot pedal being disposed toward a center of said vehicle from said longitudinal plane, and a generally vertical transverse plane that extends along an intersection between said front fender assembly and said foot step and said master cylinder being positioned generally forward of said transverse plane.

12. The vehicle of claim 11, wherein said foot pedal is pivotally mounted to said frame assembly at a location generally forward of said transverse plane.

13. The vehicle of claim 12, wherein said foot pedal selectively operates said master cylinder through an intermediate lever.

14. The vehicle of claim 13, wherein said intermediate lever is a brake lever that is pivotally mounted to said frame assembly at a location generally forward of said transverse plane.

15. The vehicle of claim 14, wherein said intermediate lever and said foot pedal are piotally mounted to said frame assembly about the same pivot axis.

16. The vehicle of claim 12, wherein said foot pedal is pivotally mounted to said frame assembly with a pivot shaft and sleeve combination.

17. The vehicle of claim 11, wherein a forward end of said foot pedal is pivotally mounted to a shaft.

18. The vehicle of claim 11, Her comprising a hand actuator that is operatively connected to said master cylinder by a brake wire.

19. An all terrain vehicle comprising a frame assembly, a front wheel being moveably connected to said frame assembly, a rear wheel being moveably connected to said frame assembly, a foot support that is positioned between said front wheel and said rear wheel, an engine being connected to said frame assembly generally between said front wheel and said rear wheel, a generally vertical longitudinal plane extending along an outer lateral surface of said engine, a seat being disposed generally above at least a portion of said engine, a steering handle being connected to said front wheel and being positioned forward of said seat, a hand actuator being connected to said steering handle, a foot actuator being disposed to one side of said seat, a braking system being connected to said hand actuator and said foot actuator, said braking system comprising a master cylinder, said master cylinder being disposed at a location generally more forward in said vehicle than a forward end of said foot support, said master cylinder and a majority of said foot actuator being disposed laterally inward of said longitudinal plane, said foot actuator comprising a foot step portion that is at least partially positioned on an opposite side of said longitudinal plane from said master cylinder, an aperture extending through said foot support and said foot step portion extending upward through said aperture and one of said hand actuator and said foot actuator being capable of selective operation of said braking system independently of the other of said hand actuator and said foot actuator.

20. The vehicle of claim 19, wherein a forward end of said foot actuator is pivotally mounted to a shaft.

21. The vehicle of claim 19, wherein said hand actuator is operatively connected to said master cylinder by a brake wire.

* * * * *